United States Patent
Xiao et al.

(10) Patent No.: US 10,622,621 B2
(45) Date of Patent: Apr. 14, 2020

(54) METHODS FOR MAKING PATTERNED, THICK, SILICON-CONTAINING ELECTRODES

(71) Applicant: GM Global Technology Operations LLC, Detroit, MI (US)

(72) Inventors: Xingcheng Xiao, Troy, MI (US); Hongliang Wang, Sterling Heights, MI (US); Qinglin Zhang, Novi, MI (US); Mark W. Verbrugge, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 15/475,737

(22) Filed: Mar. 31, 2017

(65) Prior Publication Data

US 2018/0287139 A1   Oct. 4, 2018

(51) Int. Cl.
*H01M 4/18* (2006.01)
*H01M 4/1395* (2010.01)
(Continued)

(52) U.S. Cl.
CPC ......... *H01M 4/1395* (2013.01); *B23K 26/361* (2015.10); *B23K 26/362* (2013.01);
(Continued)

(58) Field of Classification Search
CPC ............. H01M 4/1395; H01M 4/0433; H01M 4/0471; H01M 4/134; H01M 4/386; H01M 4/387; H01M 4/0435
See application file for complete search history.

(56) References Cited

U.S. PATENT DOCUMENTS 7,736,805 B2   6/2010   Nazri et al.
8,101,152 B1   1/2012   Halalay et al.
(Continued)

FOREIGN PATENT DOCUMENTS

CN   108695486 A   10/2018
DE   102018107519 A1   10/2018

OTHER PUBLICATIONS

Xiao, X. et al.; "Improved cycling stability of silicon thin film electrodes through patterning for high energy density lithium batteries"; Journal of Power Sources; vol. 196; 2011; pp. 1409-1416.
(Continued)

*Primary Examiner* — Jane J Rhee
(74) *Attorney, Agent, or Firm* — Harness, Dickey & Pierce, P.L.C.

(57) ABSTRACT

A high performance electrode for an electrochemical cell including electroactive materials having a large charge capacity and that undergo substantial volumetric expansion and contraction during cycling of the electrochemical cell and a method for making the high performance electrode are provided. The electroactive material of the high performance electrode may have a thickness greater than or equal to about 1 μm. Methods of forming the high performance electrodes includes patterning the electroactive material to form a plurality of void spaces using a high-speed process selected from the group consisting of: laser ablation, electron beam machining, ion beam milling, roll forming, embossing, lithography, and combinations thereof. The plurality of void spaces accommodates the volumetric expansion and contraction to minimize cracking and damage to the electrode during cycling of the electrochemical cell.

18 Claims, 7 Drawing Sheets

(51) Int. Cl.
*H01M 4/134* (2010.01)
*H01M 4/38* (2006.01)
*H01M 4/04* (2006.01)
*B23K 26/362* (2014.01)
*B23K 26/361* (2014.01)
*B23K 101/36* (2006.01)
*H01M 4/02* (2006.01)
*H01M 10/052* (2010.01)

(52) U.S. Cl.
CPC ....... *H01M 4/0433* (2013.01); *H01M 4/0435* (2013.01); *H01M 4/0471* (2013.01); *H01M 4/134* (2013.01); *H01M 4/386* (2013.01); *H01M 4/387* (2013.01); *B23K 2101/36* (2018.08); *H01M 10/052* (2013.01); *H01M 2004/027* (2013.01); *Y02E 60/122* (2013.01); *Y02T 10/7011* (2013.01)

(56) References Cited

U.S. PATENT DOCUMENTS

| | | |
|---|---|---|
| 8,399,138 B2 | 3/2013 | Timmons |
| 8,420,259 B2 | 4/2013 | Xiao et al. |
| 8,440,350 B1 | 5/2013 | Verbrugge et al. |
| 8,642,201 B2 | 2/2014 | Cheng et al. |
| 8,658,295 B2 | 2/2014 | Cheng et al. |
| 8,679,680 B2 | 3/2014 | Vanimisetti et al. |
| 8,828,481 B2 | 9/2014 | Burton et al. |
| 8,835,056 B2 | 9/2014 | Xiao et al. |
| 9,012,075 B2 | 4/2015 | Verbrugge et al. |
| 9,034,519 B2 | 5/2015 | Xiao et al. |
| 9,093,705 B2 | 7/2015 | Xiao et al. |
| 9,142,830 B2 | 9/2015 | Xiao et al. |
| 9,153,819 B2 | 10/2015 | Huang et al. |
| 9,356,281 B2 | 5/2016 | Verbrugge et al. |
| 9,362,551 B2 | 6/2016 | Sachdev et al. |
| 9,362,582 B2 | 6/2016 | Brantley et al. |
| 9,379,374 B2 | 6/2016 | Liu et al. |
| 9,531,004 B2 | 12/2016 | Xiao et al. |
| 9,583,767 B2 | 2/2017 | Verbrugge et al. |
| 2012/0100403 A1 | 4/2012 | Wang et al. |
| 2012/0229096 A1 | 9/2012 | Nazri |
| 2012/0328927 A1 | 12/2012 | Timmons et al. |
| 2013/0099159 A1 | 4/2013 | Halalay et al. |
| 2017/0033371 A1* | 2/2017 | Cordova ............... H01M 2/361 |
| 2017/0092950 A1 | 3/2017 | Xiao et al. |
| 2017/0098817 A1 | 4/2017 | Yu et al. |
| 2017/0179482 A1 | 6/2017 | Verbrugge et al. |

OTHER PUBLICATIONS

Soni, Sumit K. et al.; "Stress Mitigation during the Lithiation of Patterned Amorphous Si Islands"; Journal of the Electrochemical Society; vol. 159, No. 1; 2012; A38-A43.

* cited by examiner

METHODS FOR MAKING PATTERNED, THICK, SILICON-CONTAINING ELECTRODES

This section provides background information related to the present disclosure which is not necessarily prior art.

The present disclosure relates to methods of patterning thick electrodes containing electroactive materials that undergo large volumetric changes during cycling, such as silicon-containing active materials, and the patterned electrodes made therefrom.

High-energy density, electrochemical cells, such as lithium ion batteries can be used in a variety of consumer products and vehicles, such as Hybrid Electric Vehicles (HEVs) and Electric Vehicles (EVs). Typical lithium ion batteries comprise a first electrode (e.g., a cathode), a second electrode (e.g., an anode), an electrolyte material, and a separator. Often a stack of lithium ion battery cells are electrically connected to increase overall output. Lithium ion batteries operate by reversibly passing lithium ions between the negative electrode and the positive electrode. A separator and an electrolyte are disposed between the negative and positive electrodes. The electrolyte is suitable for conducting lithium ions and may be in solid or liquid form. Lithium ions move from a cathode (positive electrode) to an anode (negative electrode) during charging of the battery, and in the opposite direction when discharging the battery.

Contact of the anode and cathode materials with the electrolyte can create an electrical potential between the electrodes. When electron current is generated in an external circuit between the electrodes, the potential is sustained by electrochemical reactions within the cells of the battery. Each of the negative and positive electrodes within a stack is connected to a current collector (typically a metal, such as copper for the anode and aluminum for the cathode). During battery usage, the current collectors associated with the two electrodes are connected by an external circuit that allows current generated by electrons to pass between the electrodes to compensate for transport of lithium ions.

Many different materials may be used to create components for a lithium ion battery. By way of non-limiting example, cathode materials for lithium batteries typically comprise an electroactive material which can be intercalated with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where $0<x<1$, $y<1$, and M may be Al, Mn, or the like), or lithium iron phosphates. The electrolyte typically contains one or more lithium salts, which may be dissolved and ionized in a non-aqueous solvent.

The negative electrode typically includes a lithium insertion material or an alloy host material. Typical electroactive materials for forming an anode include lithium-graphite intercalation compounds, lithium-silicon intercalation compounds, lithium-tin intercalation compounds, lithium alloys. While graphite compounds are most common, recently, anode materials with high specific capacity (in comparison with graphite) are of growing interest. For example, silicon has the highest known theoretical charge capacity for lithium, making it one of the most promising materials for rechargeable lithium ion batteries.

However, current anode materials comprising silicon, or similar large volume expansion material, such as tin or germanium, suffer from significant drawbacks. Large volume changes (e.g., volume expansion/contraction of greater than 300%) of silicon-containing materials during lithium insertion/extraction (e.g., intercalation/alloy and deintercalation/dealloy-intercalation/alloy) can result in physical damage to the electrode, including wrinkling, fracture, or cracking. Such volumetric expansion thus can lead to loss of electrical contact and electrode activity. This is especially true at the loading density levels required for commercial viability of silicon-containing electrodes. The large volumetric expansion during intercalation/alloy of the anode comprising silicon, or other large volume expansion materials, can thus result in a decline of electrochemical cyclic performance, diminished Coulombic charge capacity (capacity fade), and extremely limited, poor cycle life.

It would be desirable to develop high performance electrode materials comprising silicon, or similar large volume expansion materials, for use in high power lithium ion batteries, which overcome the current shortcomings that prevent their widespread commercial use, especially in vehicle applications. For long term and effective use, negative electrode/anode materials containing large volume expansion materials should be capable of being included at high loading densities, while avoiding physical damage to provide minimal capacity fade and maximized charge capacity for long-term use in lithium ion batteries.

SUMMARY

This section provides a general summary of the disclosure, and is not a comprehensive disclosure of its full scope or all of its features.

In various aspects, the present disclosure provides an exemplary method of making an electrode for an electrochemical cell. The method may include patterning an electroactive material layer to form a plurality of void spaces. The electroactive material layer may be patterned using a high-speed process selected from the group consisting of: laser ablation, electron beam machining, ion beam milling, roll forming, embossing, lithography, and combinations thereof. The electroactive material layer may have a thickness of greater than or equal to about 1 μm. The electroactive material layer may include an electroactive material that undergoes volumetric expansion and contraction during cycling of the electrochemical cell. The plurality of void spaces may accommodate the volumetric expansion and contraction to minimize cracking and damage to the electrode during cycling.

In one variation, the high-speed process may have a speed of greater than or equal to about 0.1 meter/second.

In one variation, the patterning may include directing laser at the electroactive material layer to form a pattern of the plurality of void spaces by laser ablation.

In one variation, the laser may have a wavelength greater than a reference wavelength corresponding to a bandgap of the electroactive material layer.

In one variation, the electroactive material layer may be disposed on a current collector and the laser may be transparent to the electroactive material layer. The laser may be absorbed by the current collector causing localized heat (e.g., plasma generation) at an interface between the electroactive material layer and the current collector inducing stress (e.g., plasma pressure) that may fracture and delaminate the electroactive material layer from the current collector. Removal of the fractured and delaminate electroactive material layer may create the plurality of void spaces.

In one variation, the laser may have an optical power output of greater than or equal to about 50 W to less than or equal to about 500 W, a frequency of greater than or equal to about 10 KHz to less than or equal to about 1 MHz, a scan speed of greater than or equal to about 0.5 meter/second to less than or equal to about 10 meters/second, and a working distance of greater than or equal to about 200 mm to less than or equal to about 500 mm.

In one variation, the laser may have a wavelength shorter than a bandgap of the electroactive material layer and the electroactive material layer may absorb the laser directly and melt or vaporize to form the plurality of void spaces.

In one variation, the electroactive material layer may include a compound including silicon (Si), tin (Sn), germanium (Ge), bismuth (Bi), zinc (Zn), tellurium (Te), lead (Pb), gallium (Ga), aluminum (Al), arsenic (As), lithium (Li), or combinations thereof.

In one variation, the electroactive material layer may comprise a compound selected from the group consisting of: SiSnAl, SiFeC, SnAl, SnFe, $SnO_2$, and combinations thereof.

In one variation, the electroactive material layer may be disposed on a current collector comprising a compound selected from the group consisting of: copper (Cu), nickel (Ni), titanium (Ti), carbon (C), alloys, and combinations thereof.

In one variation, the electroactive material layer is patterned to form a repeating pattern of closed geometry structures.

In other aspects, the present disclosure provides an exemplary method of making a negative electrode for an electrochemical cell that cycles lithium ions. The method may include directing laser towards a negative electroactive material layer to form a pattern or a plurality of void spaces. The negative electroactive material layer may have a thickness of greater than or equal to about 1 µm. The negative electroactive material may include silicon (Si), tin (Sn), germanium (Ge), alloys, and combinations thereof. The plurality of void spaces may accommodate volumetric expansion and contraction occurring in the negative electroactive material during cycling of lithium ions to minimize cracking and damage of the negative electrode.

In one variation, the laser may have a wavelength of greater than a reference wavelength corresponding to a bandgap of the negative electroactive material layer.

In one variation, the laser may have an optical power output of greater than or equal to about 100 W to less than or equal to about 500 W, a frequency of greater than or equal to about 10 KHz to less than or equal to about 1 MHz, a scan speed of greater than or equal to about 0.5 meter/second to less than or equal to about 10 meters/second, and a working distance of greater than or equal to about 200 mm to less than or equal to about 500 mm.

In one variation, the laser may have a wavelength shorter than a reference wavelength corresponding to a bandgap of the negative electroactive material layer.

In one variation, the negative electroactive material layer may be disposed on a current collector comprising a compound selected from the group consisting of: copper (Cu), nickel (Ni), titanium (Ti), carbon (C), iron (Fe), alloys, and combinations thereof.

In one variation, the negative electroactive material layer may be patterned to form a repeating pattern of closed geometry structures.

In one variation, the plurality of void spaces may occupy a volume of greater than or equal to about 5% by volume of the total volume of the negative electroactive material layer.

In other aspects, the present disclosure provides an exemplary negative electrode for an electrochemical cell that cycles lithium ions. The negative electrode may include a current collector and a negative electroactive material layer. The negative electroactive material layer may include a negative electroactive material, including silicon (Si), tin (Sn), germanium (Ge), alloys, and combinations thereof. The negative electroactive material layer may have a thickness of greater than or equal to about 1 µm and a pattern of a plurality of void spaces that accommodate volumetric expansion and contraction that may occur in the negative electroactive material layer during cycling of lithium ions to minimize cracking and damage of the negative electrode.

In one variation, the negative electroactive material layer may be patterned to form a repeating pattern of closed geometry structures and the plurality of void spaces may occupy a volume of greater than or equal to about 5% by volume of a total volume of the negative electroactive material layer.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1D are schematics of an exemplary method for patterning an electrode, comprising an electroactive material layer and current collector, to form a plurality of void spaces using indirect laser ablation. FIG. 1A illustrates the use of laser to heat a localized interface between the electroactive material layer and current collector. FIG. 1B illustrates resulting deformation of the electroactive material layer resulting from thermal expansion differences between the electroactive material layer and current collector. FIG. 1C illustrates cracking and delamination of the electroactive material layer above the current collector. FIG. 1D illustrates the removal of the cracked portions of the electroactive material layer and remaining void space that can define a pattern therein.

Figure 4A:
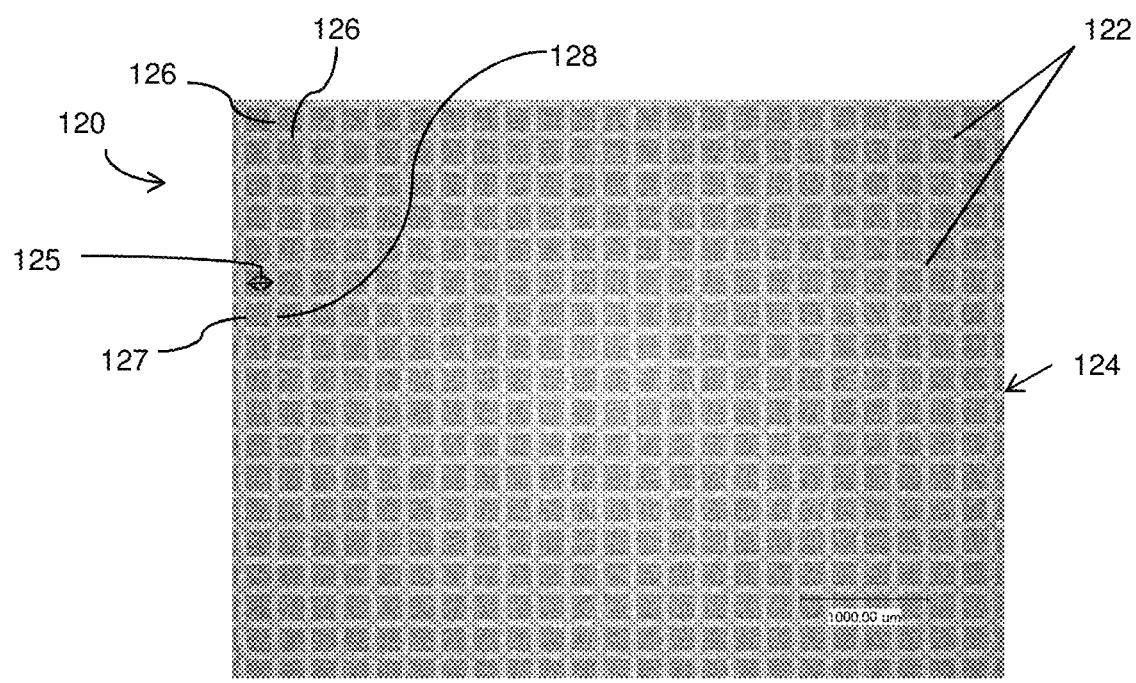
Figure 4B:
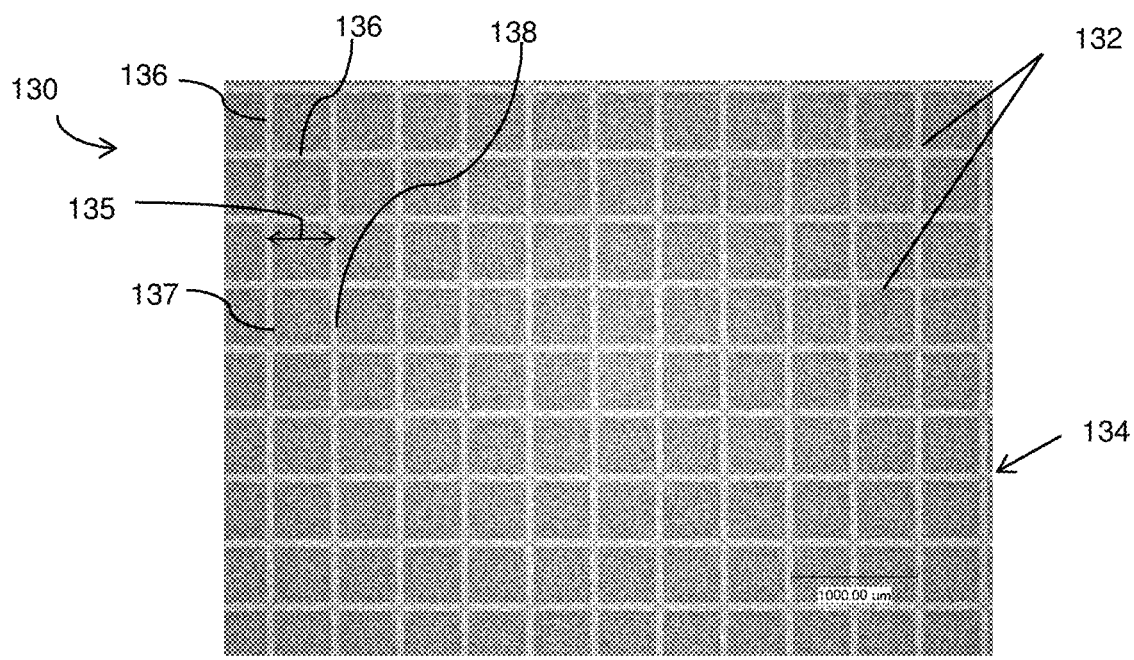
Figure 4C:
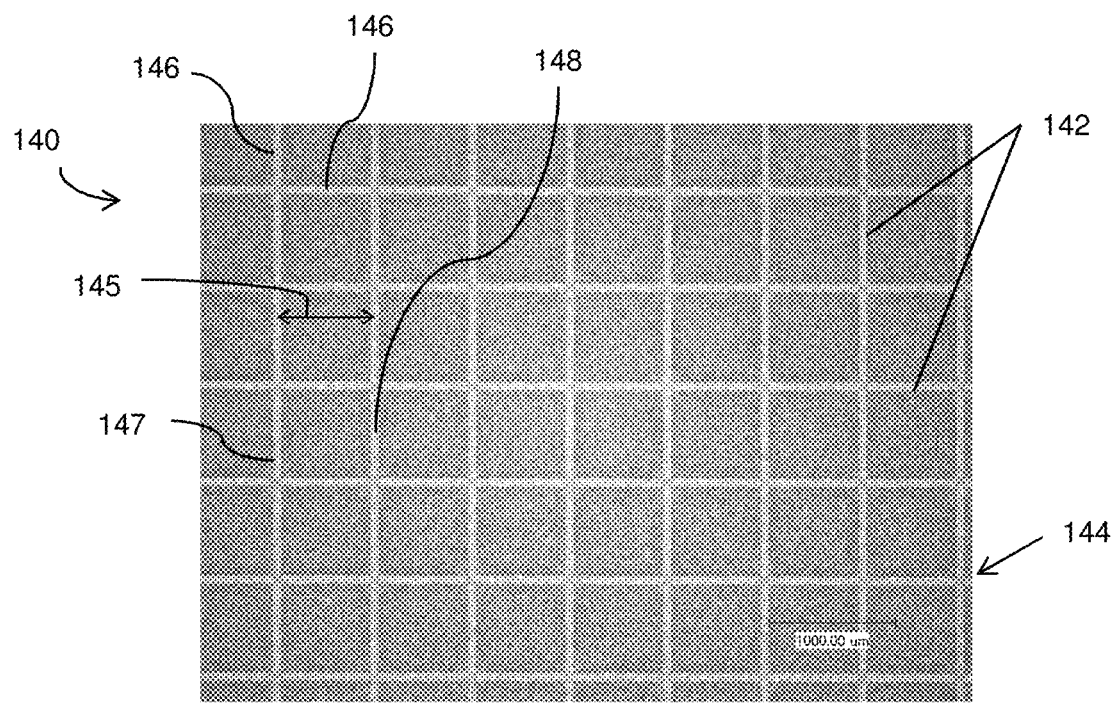
Figure 4D:
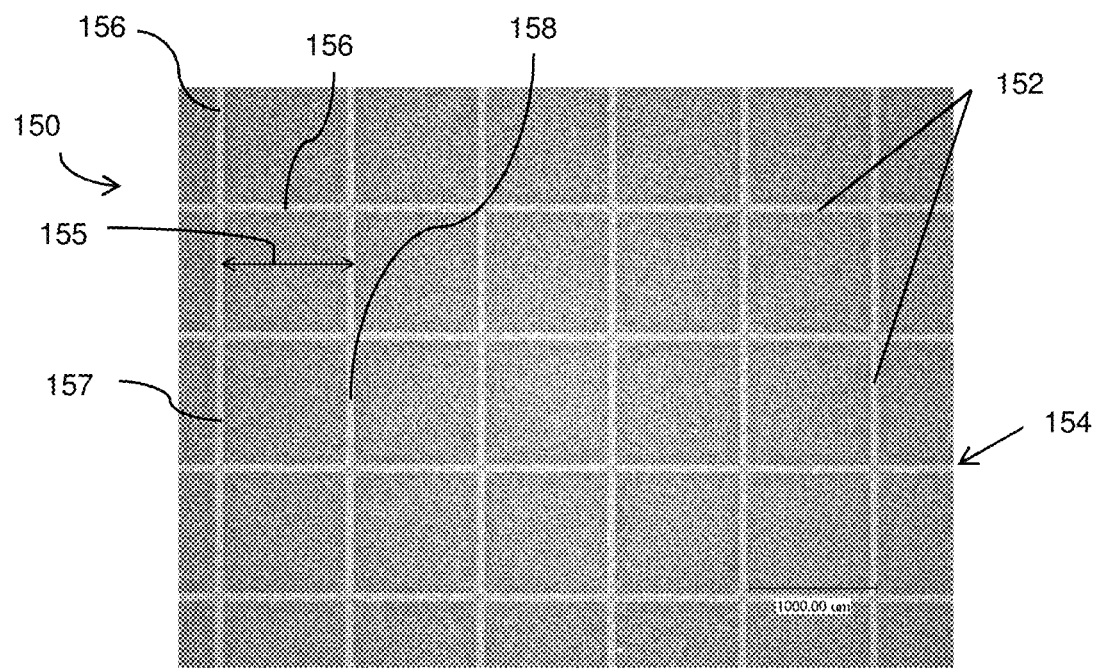

FIGS. 4A-4D are schematics of exemplary patterned electroactive material layers prepared in accordance with different variations of the present disclosure. FIG. 4A illustrates an electroactive material layer wherein the void spaces form a grid pattern having interconnecting lines with a spacing between adjacent parallel lines of about 250 µm. FIG. 4B illustrates an electroactive material layer where the formed void spaces define a grid pattern having interconnecting lines with a spacing between adjacent parallel lines of about 500 µm. FIG. 4C illustrates an electroactive material layer wherein the formed void spaces define a grid pattern having interconnecting lines with a spacing between adjacent parallel lines of about 750 µm. FIG. 4D illustrates an electroactive material layer wherein the formed void spaces define a grid pattern having interconnecting lines with a spacing between adjacent parallel lines of about 1000 µm.

Figure 5:
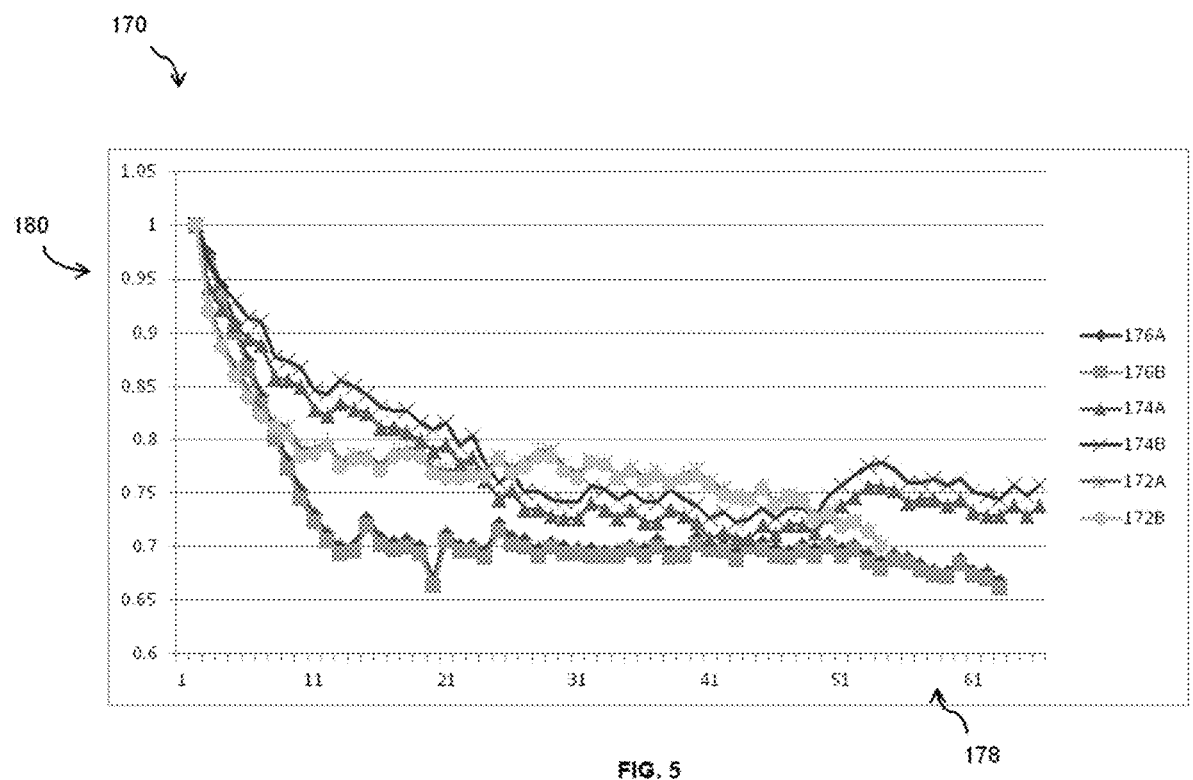

FIG. 5 is a graphical illustration of the capacity retention per cycle of the electroactive material layers illustrated in FIGS. 4A and 4B.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges. As referred to herein, ranges are, unless specified otherwise, inclusive of endpoints and include disclosure of all distinct values and further divided ranges within the entire range. Thus, for example, a range of "from A to B" or "from about A to about B" is inclusive of A and B.

Example embodiments will now be described more fully with reference to the accompanying drawings.

Negative electrode or anode materials with relatively high specific capacity (e.g., silicon) are desirable for use as negative electrode active material in electrochemical cells (e.g., lithium-based batteries). However, certain negative electrode active materials with high specific capacities also undergo substantial large volume changes, for example, (e.g., about 300%) volumetric expansion and contraction during cycling (e.g., lithium insertion/extraction) of an electrochemical cell. The substantial volumetric expansion and contraction experienced during cycling and operation may result in physical damage to the electrode materials, including wrinkling, fracture, or cracking of the electrode active materials and current collectors coupled thereto, which may result in a loss of electrical contact (e.g., isolation of the active materials) and capacity loss (e.g., poor life cycling). The present technology provides an electrode for an electrochemical cell designed to accommodate the volumetric expansion and contraction of negative electrode active materials with high specific capacities or other electroactive materials that undergo similar large volume changes during cycling and operation. Accordingly, in various aspects, the present disclosure provides a method for making an electrode designed to accommodate volumetric expansion and contraction of the materials therein for use in an electrochemical cell.

In various aspects, the method includes patterning an electroactive material layer for an electrode of an electrochemical cell that includes an electroactive material that undergoes significant volumetric expansion and contraction during cycling of the electrochemical cell. For example, the electroactive material undergoes substantial (e.g., greater than or equal to about 300%) volumetric expansion and contraction during cycling of the electrochemical cell. In certain variations, such an electroactive material may include a compound selected from the group consisting of: silicon (Si), tin (Sn), germanium (Ge), bismuth (Bi), zinc (Zn), tellurium (Te), lead (Pb), gallium (Ga), aluminum (Al), arsenic (As), lithium (Li), alloys, and combinations thereof. For example only, in certain instances, the electrode may include an electroactive material selected from the group consisting of: Si; $SiO_2$; SiSnAl; SiFeC; SnAl; SnFe; $SnO_2$; SiGe; $LiSi_x$, where $0 \leq x \leq 1$; $LiSn_x$, $0 \leq x \leq 1$; and combinations thereof.

In certain instances, the electroactive material layer of the electrode is a solid and thick continuous film comprising the electroactive material. In certain aspects, prior to the patterning, the electroactive layer of the electrode comprises greater than or equal to about 95% by mass of electroactive material, optionally greater than or equal to about 97% by mass of the electroactive material, optionally greater than or equal to about 98% by mass of the electroactive material, and in certain variations, optionally greater than or equal to about 99% to about 100% by mass of the electroactive material.

The electroactive layer/electrode comprising the electroactive material may have a thickness greater than or equal to about 1 µm. In certain instances, the electroactive material comprising the electrode may have a thickness greater than or equal to about 1 µm to less than or equal to about 12 µm. In this manner, a thick electroactive layer/electrode having such a thickness contains a large amount of electroactive material and provides a relatively large power density.

In certain instances, the electrode may further include a current collector comprising a relatively ductile metal or metal alloy that is electrically conductive. The current collector may have a physical ductility greater than or equal to about 0.40 and less than or equal to about 1. The current collector may comprise a compound selected from the group consisting of: gold (Au), lead (Pb), niobium (Nb), palladium (Pd), platinum (Pt), silver (Ag), vanadium (V), tin (Sn), aluminum (Al), copper (Cu), tantalum (Ta), nickel (Ni), iron (Fe), alloys and combinations thereof. For example, the current collector may be formed of a material selected from the group consisting of: stainless steel, nickel and nickel alloys, copper and copper alloys, titanium and titanium alloys, carbon or graphite, and combinations thereof. The electroactive material may be disposed as an electroactive material layer onto the current collector to form an electrode. In certain instances, the electroactive material may be disposed on the current collector via a deposition technique including, for example only, chemical vapor deposition (CVD) or physical vapor disposition (PVD). The current collector may be a continuous film or layer or may be a mesh or other structure. The current collector may have a thickness greater than or equal to about 4 µm. In certain instances, the current collector may have a thickness greater than or equal to about 4 µm to less than or equal to about 20 µm.

In certain aspects, the methods provided by the present teachings includes patterning the electroactive material layer that will form the electrode to create a plurality of void spaces therein that accommodate the volumetric expansion and contraction of the electroactive material to minimize cracking and damage to the electrode that may result during cycling of the electrochemical cell comprising the electrode. The void spaces are empty or hollow continuous regions that define a predetermined pattern within a solid film of electroactive material layer/electrode and can be distinguished from discontinuous and distributed pores, for example only, as found in a porous electrode composite matrix having a mixture of binder, electroactive material, and electrically conductive material. In various instances, the plurality of void spaces allow for reversible, elastic deformation of the electroactive material layer within the electrode.

In certain instances, the electroactive material may be patterned to form a repeating pattern of closed geometry structures. The closed geometry structures have a two dimensional shape and extend into the electroactive material layer/electrode at a depth in a third dimension. The repeating pattern of closed geometry structures may be densely packed and include geometric structures having linear features. For example only, the plurality of voids or free spaces may form rectangles, squares, triangles, pentagons, hexagons, and/or octagons within the electroactive material. In other instances, the plurality of void or free spaces may form circles within the electroactive material.

In certain instances, the plurality of void spaces may have widths determined by the thickness of the electroactive material. For example, the plurality of void spaces may have widths of greater than or equal to about twice the thickness of the electroactive material layer. In certain instances, the plurality of free spaces may have widths greater than or equal to about 50 µm to less than or equal to about 5 mm. In certain instances, the plurality of void spaces may occupy a volume of greater than or equal to about 5% by volume of the total volume of the electroactive material.

In various aspects, the plurality of void spaces may be patterned using a high-speed (e.g., having a speed of greater than or equal to about 0.1 meter/second) process selected from the group consisting of: laser etching or ablation, electron beam machining or etching, ion beam milling or etching, roll forming, embossing, lithography, and combinations thereof. For example, FIGS. 1A-1D illustrates an exemplary method of patterning an electrode 80 using indirect laser ablation. In certain instances, the high-speed processes may be integrated into an electrochemical cell fabrication or assembly line. In other instances, the high-speed processes may be integrated into a coating deposition line. Thus, the present methods may be conducted as part of a roll-to-roll continuous manufacturing process.

Figure 1A:
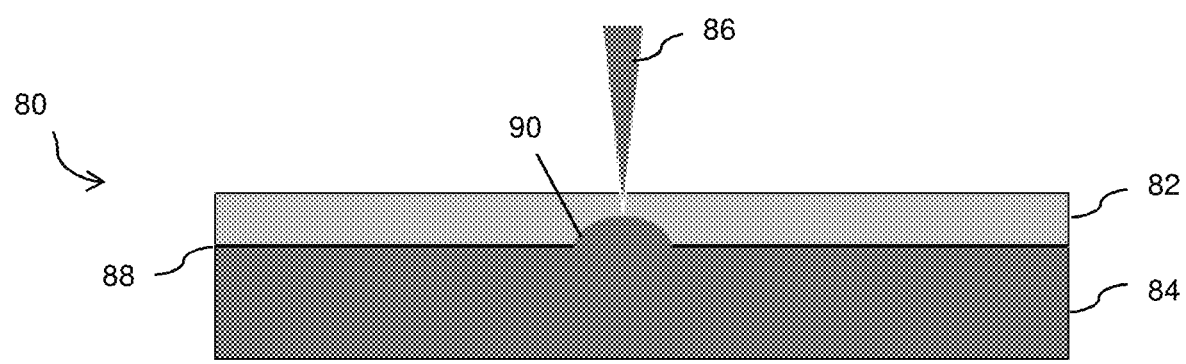

FIG. 1A illustrates an exemplary electrode 80 including a solid electroactive material layer 82 disposed on a current collector 84. The electroactive material layer 82 includes an electroactive material that will undergo substantial (e.g., greater than or equal to about 300%) volumetric expansion and contraction during cycling of an electrochemical cell comprising the electrode 80. For example, the electroactive material layer 82 may include an electroactive material comprising silicon (Si), germanium (Ge), tellurium (Te), arsenic (As), lithium (Li), or alloys or combinations thereof. The electroactive materials have known bandgaps. For example only, silicon (Si) has a bandgap of about 1.11 eV, germanium (Ge) has a bandgap of about 0.67 eV, and silicon oxide ($SiO_2$) has a bandgap of about 9 eV. The bandgaps of the materials are related to a threshold or reference wavelength, below which damage occurs and above which the material is transparent. It should be noted that metals have a bandgap of zero. Therefore, indirect laser ablation may be unavailable in instances where the electroactive material layer 82 substantially comprises basic metals. The current collector includes a compound selected from the group consisting of: gold (Au), lead (Pb), niobium (Nb), palladium (Pd), platinum (Pt), silver (Ag), vanadium (V), tin (Sn), aluminum (Al), copper (Cu), tantalum (Ta), nickel (Ni), iron (Fe), and combinations thereof.

A laser 86 having a wavelength greater than a reference wavelength corresponding to the bandgap of the electroactive material layer 82 may be directed at the electroactive material layer 82. For example only, in instances where the electrode material layer 82 comprises amorphous silicon, the bandgap is about 1.7 eV and a corresponding reference wavelength is about 730 nm. Thus, to directly remove material from the electroactive material layer 82, the laser 86 directed towards the electroactive material layer 82 may have a wavelength of less than about 730 nm. Here, the laser 86 generated by a suitable laser source may have a wavelength of about 1,064 nm, so that the laser is above the reference wavelength and passes through the electroactive material layer 82. In various instances, the laser 86 having a wavelength greater than a reference wavelength corresponding to the bandgap of the electroactive material layer 82 may have an optical power output of greater than or equal to about 50 W to less than or equal to about 500 W; a frequency of greater than or equal to about 10 KHz to less than or equal to about 1 MHz; a scan speed of greater than or equal to about 0.5 meter/second to less than or equal to about 10 meters/second; and a working distance of greater than or equal to about 200 mm to less than or equal to about 500 mm.

Figure 1B:
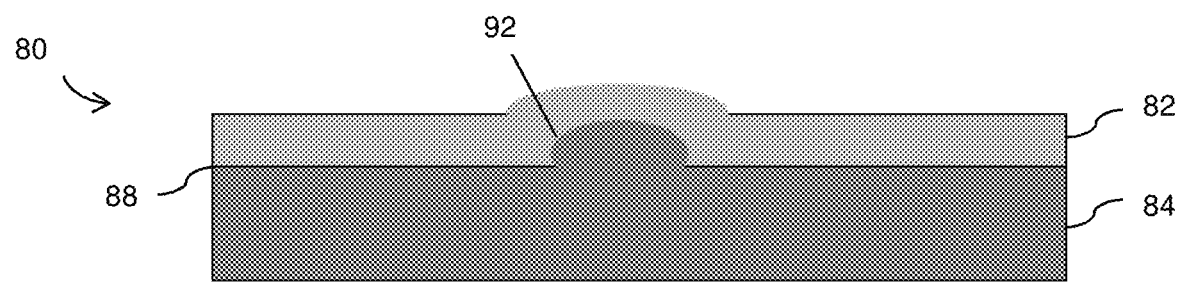
Figure 1C:
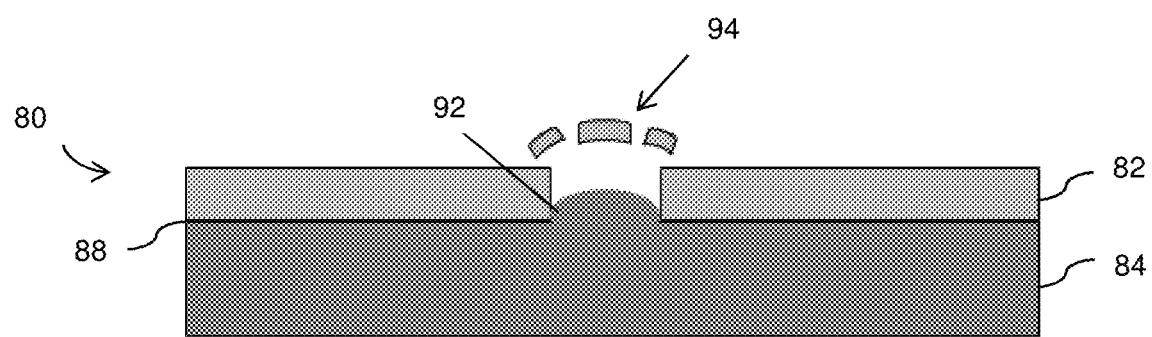

Laser 86 having a wavelength greater than the reference wavelength corresponding to the bandgap of the electroactive material layer 82 will be transparent with respect to the electroactive material layer 82; however, in accordance with certain aspects of the present disclosure, may be absorbed by the underlying current collector 84 material. As seen in FIG. 1A, absorption of the laser 86 by the current collector 84 may cause localized heat (e.g. plasma generation) 90 at an interface 88 between the electroactive material layer 82 and the current collector 84. As seen in FIG. 1B, the localized heating of the interface 88 may induce stress (e.g., plasma pressure) 92. The induced stress 92 may fractures the electroactive material layer 82 and delaminate the electroactive material layer 82 from the current collector 84 as seen in FIG. 1C. For example, the induced pressure 92 may pull the electroactive material layer 82 upwards thereby causing fractures within and delamination or the electroactive material layer 92.

Figure 1D:
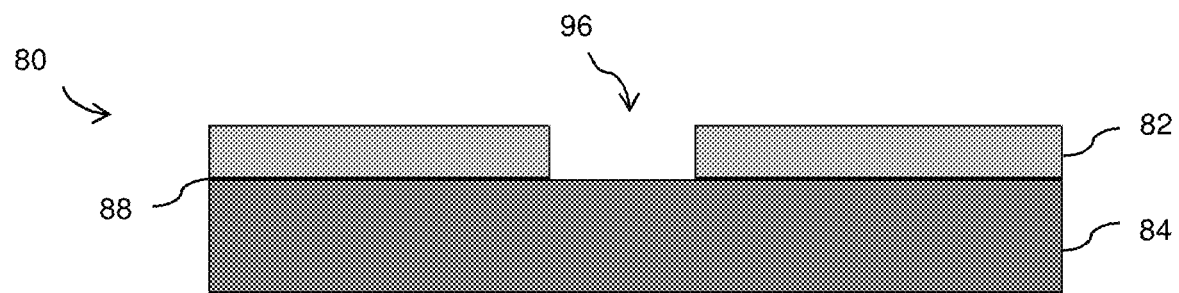

Stress 92 at the interface 88 may result from a thermal difference, mismatch between the electroactive material layer 82 and current collector 84. For example only, silicon (Si), which may be included in the electroactive material layer 82, has a linear thermal expansion coefficient of about $2.6 \times 10^{-6}$ $K^{-1}$, while copper (Cu), which may be included in the current collector 84, has a linear thermal expansion coefficient of about $17 \times 10^{-6}$ $K^{-1}$. As seen in FIG. 1D, the damaged portions or fragments 94 of the electroactive material layer 82 may be removed leaving one or more void spaces 96 that will accommodate the volumetric expansion and contraction of the electroactive material comprising the electroactive material layer 82. The void spaces 96 have a width less than or equal to the minimum laser spot size at focal plane of the laser 86. In certain instances, high pulse overlapping (e.g. greater than or equal to about 80%) during laser scanning may create linear void spaces within the electroactive material layer 82.

In various instances, the electrochemical material layer 82 may be patterned to have a repeating pattern of closed geometry structures. As the patterning processes may be linear processes, predetermined linear void space patterns can be generated in the solid electroactive material layer 82 via computer controlled programming. In one variation, the electrochemical material layer 82 may have a relatively dense pattern of repeating polygons formed by linear scans of the laser 86. The plurality of void spaces 96 may occupy a volume of greater than or equal to about 5% by volume of a total volume of the electroactive material layer 82.

Figure 2:
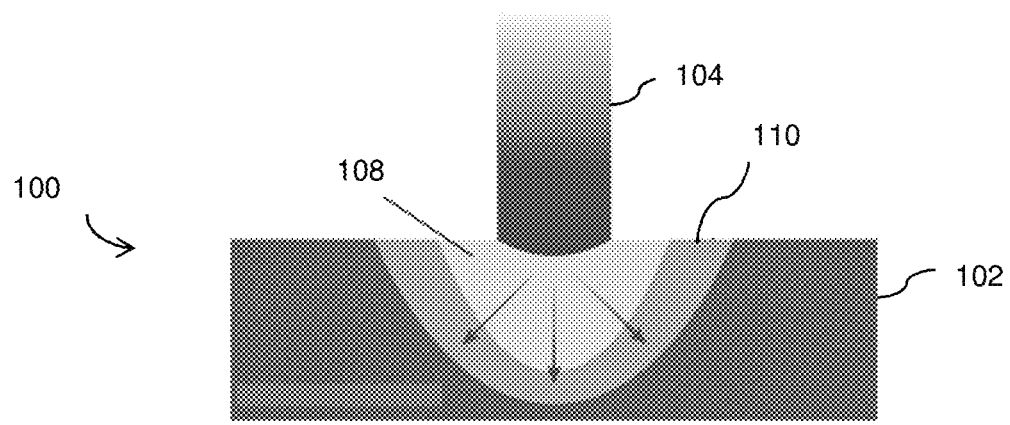
FIG. 2 is a schematic of an exemplary method for patterning an electrode using direct laser ablation.

FIG. 2 illustrates another exemplary method of patterning an electrode. FIG. 2 illustrates an exemplary method of patterning an electrode 100 including an electroactive material layer 102 using direct laser ablation.

The electroactive material layer 102 of electrode 100 will undergo substantial (e.g., greater than or equal to about 300%) volumetric expansion and contraction during cycling of an electrochemical cell comprising the electrode 100. For example, the electroactive material layer 82 may include an electroactive material comprising silicon (Si), tin (Sn), germanium (Ge), bismuth (Bi), zinc (Zn), tellurium (Te), lead (Pb), gallium (Ga), aluminum (Al), arsenic (As), lithium (Li), or alloys or combinations thereof. As noted above, a direct laser ablation process may be used where the electroactive material in the electroactive material layer 82 comprises a metal material having a bandgap of zero.

Laser 104 having a wavelength shorter than a reference wavelength corresponding to the bandgap of the compound or compounds comprising the electroactive material 102 may be directly absorbed by the electrode 100. For example only, in instances where the electroactive material layer 102 comprises amorphous silicon, a bandgap for amorphous silicon is about 1.7 eV corresponding to a reference wavelength of about 730 nm. Thus, the laser 104 may be selected to have a wavelength shorter than 730 nm so as to melt and ablate the electroactive material from the electroactive material layer 102. In various instances, the laser 104 having a wavelength shorter than a reference wavelength corresponding to the bandgap of the compound or compounds comprising the electroactive material 102 may have an optical power output of greater than or equal to about 50 W to less than or equal to about 500 W; a frequency of greater than or equal to about 10 KHz to less than or equal to about 1 MHz; a scan speed of greater than or equal to about 0.5 meter/second to less than or equal to about 10 meters/second; and a working distance of greater than or equal to about 200 mm to less than or equal to about 500 mm.

Laser 104 having a wavelength shorter than a reference wavelength corresponding to the bandgap of the compound or compounds comprising the electroactive material 102 will be absorbed by the electroactive material 102. Absorption of the laser 104 will cause the electroactive material 102 to melt and vaporize in the laser irradiation region creating a material removal zone 108 and a heat-affected zone 110. In this manner, the electroactive material 102 is directly ablated to form a plurality of corresponding void spaces that will accommodate the volumetric expansion and contraction of the compound or compounds comprising the electroactive material 102. In various instances, the electrochemical material 102 may be patterned to have a repeating pattern of closed geometry structures. The electrochemical material 102 may have a pattern of repeating polygons formed by linear scans of the laser 104. The plurality of void spaces may occupy a volume of greater than or equal to about 5% by volume of a total volume of the electroactive material 102.

Figure 3:
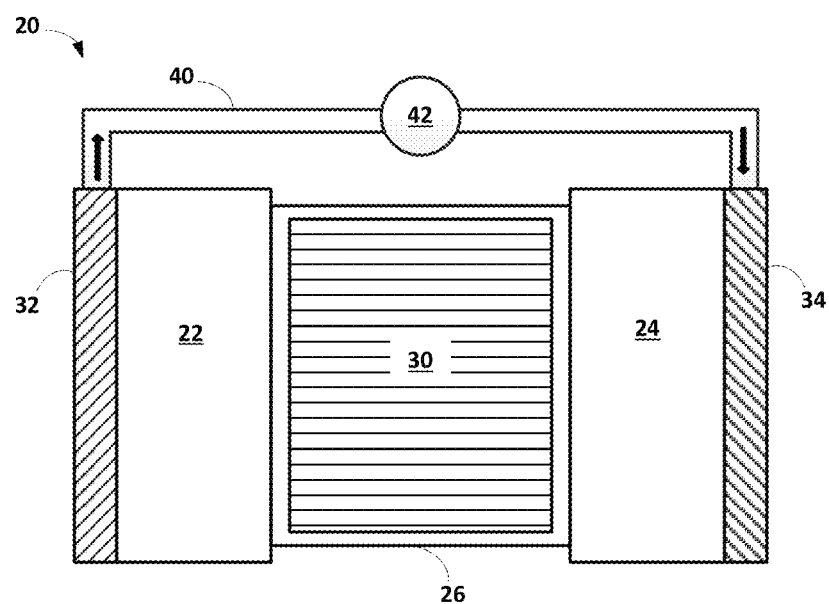
FIG. 3 is a schematic of an exemplary electrochemical battery cell.

In various aspects, the patterned electrode according to certain aspects of the present disclosure can be used as a negative electrode for an electrochemical cell that cycles lithium ions (e.g., a lithium ion battery). Accordingly, FIG. 3 provides an exemplary schematic illustration of a lithium ion battery 20. Lithium ion battery 20 includes a negative electrode 22, a negative current collector 32 in contact with the negative electrode 22, a positive electrode 24, a positive current collector 34 in contact with the positive electrode 24, and a separator 26 disposed between the negative and positive electrodes 22, 24. The negative electrode 22 may be referred to herein as an anode and the positive electrode 24 as a cathode. In certain instances, each of the negative current collector 32, negative electrode 22, the separator 26, positive electrode 24, and positive current collector 34 may be assembled in layers connected in electrical parallel arrangement to provide a suitable energy package.

The negative electrode 22 includes an electroactive material as a lithium host material capable of functioning as a negative terminal of a lithium ion battery. The electroactive material may undergo substantial volumetric expansion and contraction during cycling of lithium ions. For example only, the electroactive material may comprise a compound comprising silicon (Si), tin (Sn), germanium (Ge), bismuth (Bi), zinc (Zn), tellurium (Te), lead (Pb), gallium (Ga), aluminum (Al), arsenic (As), lithium (Li), or combinations thereof. In certain instances, the negative electrode 22 may further include a polymeric binder material to structurally fortify the electroactive material.

The electroactive material comprising the negative electrode 22 may be patterned to include a plurality of void spaces to accommodate volumetric expansion and contraction that may occur in the negative electroactive material during cycling of lithium ions. The plurality of void spaces may be patterned in the electroactive material using a high-speed (e.g., ≥0.1 meter/second) process selected from the group consisting of: laser etching or ablation, electron beam machining, ion beam milling, roll forming, embossing, lithography, and combinations thereof. The electroactive material comprising the negative electrode 22 may be patterned using a high-speed process to form a repeating pattern of closed geometry structures.

A negative electrode current collector 32 may be positioned at or near the negative electrode 22, which include the electroactive material having a plurality of void spaces to accommodate volumetric expansion and contraction that may occur in the negative electroactive material during cycling of lithium ions. The current collector 32 may comprise a relatively ductile metal or metal alloy that is electrically conductive. The current collector 32 may include a compound selected from the group consisting of: gold (Au), lead (Pb), niobium (Nb), palladium (Pd), platinum (Pt), silver (Ag), vanadium (V), tin (Sn), aluminum (Al), copper (Cu), tantalum (Ta), nickel (Ni), iron (Fe), and combinations thereof.

The separator 26 positioned between the negative electrode 22 and the positive electrode 24 may operate as both an electrical insulator and a mechanical support, preventing physical contact and, consequently, the occurrence of a short circuit. Further, the separator 26, in addition to providing a physical barrier between the two electrodes 22, 24, may provide a minimal resistance path for internal passage of lithium ions (and related anions) for facilitating functioning of the lithium ion battery 20.

The separator 30 may comprise a microporous polymeric separator including a polyolefin. The polyolefin may be a homopolymer (e.g., derived from a single monomer constituent) or a heteropolymer (e.g., derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. For example only, the polyolefin may be polyethylene (PE), polypropylene (PP), or a combination thereof.

The separator 30, as a microporous polymeric separator, may be a single layer or a multi-layer laminate, which may be fabricated from either a dry or wet process. In certain instances, a single layer of the polyolefin may form the entire microporous polymer separator 30. In other instances, the separator 30 may be a fibrous membrane having an abundance of pores extending between the opposing surfaces and may have a thickness of less than a millimeter. In still other instances, multiple discrete layers of similar or dissimilar polyolefins may be assembled to form the microporous polymer separator 30. The microporous polymer separator 30 may include other polymers in addition to the polyolefin. For example only, the separator 30 may also include polyethylene terephthalate (PET), polyvinylidene fluoride (PVDF), and/or a polyamide. The polyolefin layer and any other optional polymer layers may be included in the microporous polymer separator 30 as a fibrous layer and may provide the microporous polymer separator 30 with appropriate structural and porosity characteristics.

The separator 26 may include an electrolyte 30 in solid or solution form that is capable of conducting lithium ions. The electrolyte 30 may also be present in the negative electrode 22 and positive electrode 24. In certain instances, the electrolyte 30 may be a non-aqueous liquid electrolyte solution that includes a lithium salt dissolved in an organic solvent or a mixture of organic solvents. For example only, the lithium salt may be selected from the group consisting of lithium hexafluorophosphate ($LiPF_6$); lithium perchlorate ($LiClO_4$); lithium tetrachloroaluminate ($LiAlCl_4$); lithium iodide (LiI); lithium bromide (LiBr); lithium thiocyanate (LiSCN); lithium tetrafluoroborate ($LiBF_4$); lithium tetraphenylborate ($LiB(C_6H_5)_4$); lithium hexafluoroarsenate ($LiAsF_6$); lithium trifluoromethanesulfonate ($LiCF_3SO_3$); bis (trifluoromethane) sulfonimide lithium salt ($LiN(CF_3SO_2)_2$); and combinations thereof. The organic solvent(s) may be selected from the group consisting of: cyclic carbonates (e.g., ethylene carbonate (EC), propylene carbonate (PC), butylene carbonate(BC)); acyclic carbonates (e.g., dimethyl carbonate (DMC), diethyl carbonate (DEC), ethylmethyl-carbonate (EMC)); aliphatic carboxylic esters (e.g., methyl formate, methyl acetate, methyl propionate); γ-lactones (e.g., γ-butyrolactone, γ-valerolactone); chain structure ethers (e.g., 1,2-dimethoxyethane, 1-2-diethoxyethane, ethoxymethoxyethane); cyclic ethers (e.g., tetrahydrofuran, 2-methyltetrahydrofuran); and combinations thereof.

The positive electrode 24 may be formed from a lithium-based active material that can sufficiently undergo lithium intercalation/alloy and deintercalation/dealloyintercalation/alloy while functioning as the positive terminal of the lithium ion battery 20. In certain instances, layered lithium transitional metal oxides may be used to form the positive electrode 24. For example only, the positive electrode 24 may comprise a lithium manganese oxide ($Li_{(1+x)}Mn_{(2-x)}O_4$), where $0 \leq x \leq 1$ (e.g., $LiMn_2O_4$); a lithium manganese nickel oxide ($LiMn_{(2-x)}Ni_xO_4$), where $0 \leq x \leq 1$ (e.g., $LiMn_{1.5}Ni_{0.5}O_4$); lithium cobalt oxide ($LiCoO_2$); lithium manganese oxide ($LiMn_2O_4$); lithium nickel oxide ($LiNiO_2$); a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$ (e.g., $LiMn_{0.33}Ni_{0.33}Co_{0.33}O_2$); a lithium nickel cobalt metal oxide ($LiNi_{(1-x-y)}Co_xM_yO_2$), where $0<x<1$, $y<1$ and M may be Al, Mn, or the like; mixed oxides lithium iron phosphates; or a lithium iron polyanion oxide (e.g., lithium iron phosphate ($LiFePO_4$) or lithium iron fluorophosphate ($Li_2FePO_4F$)). In certain instances, the positive electrode 24 may further include a polymeric binder material to structurally fortify the lithium-based active material. In certain instances, the active materials of the positive electrode 24 may be intermingled with at least one polymeric binder by slurry casting active materials with such binders.

A positive electrode current collector 34 may be positioned at or near the positive electrode 24. The current collector 34 may comprise a relatively ductile metal or metal alloy that is electrically conductive. The current collector 34 may include a compound selected from the group consisting of: gold (Au), lead (Pb), niobium (Nb), palladium (Pd), platinum (Pt), silver (Ag), vanadium (V), tin (Sn), aluminum (Al), copper (Cu), tantalum (Ta), nickel (Ni), iron (Fe), and combinations thereof.

The negative electrode current collector 32 and positive electrode current collector 34 may respectively collect and move free electrons to and from an external circuit 40. The external circuit 40 and load 42 may connect the negative electrode 22 through its current collector 32 and the positive electrode 24 through its current collector 34. The lithium ion battery 20 may generate an electric current during discharge by way of reversible electrochemical reactions that occur when the external circuit 40 is closed (e.g., the negative electrode 22 is connected to the positive electrode 34) and the negative electrode 22 contains a greater relative quantity of intercalated lithium. The chemical potential difference between the positive electrode 24 and the negative electrode 22 may drive electrons produced by the oxidation of intercalated lithium at the negative electrode 22 through the external circuit 40 toward the positive electrode 24. Lithium ions, which may also be produced at the negative electrode, may be concurrently transferred through the electrolyte 30 and separator 26 towards the positive electrode 24. The electrons may flow through the external circuit 40 and the lithium ions migrate across the separator 26 in the electrolyte 30 to form intercalated lithium at the positive electrode 24. The electric current passing through the external circuit 40 may be harnessed and directed through the load device 42 until the intercalated lithium in the negative electrode 22 is depleted and the capacity of the lithium ion battery 20 diminished.

The lithium ion battery 20 may be charged or re-powered at any time by connecting an external power source to the lithium ion battery 20 to reverse the electrochemical reactions that occur during battery discharge. The connection of an external power source to the lithium ion battery 20 may facilitate the otherwise non-spontaneous oxidation of intercalated lithium at the positive electrode 24 to produce electrons and lithium ions. The electrons, which may flow back towards the negative electrode 22 through the external circuit 40, and the lithium ions, which may be carried by the electrolyte 30 across the separator 26 back towards the negative electrode 22, may reunite at the negative electrode 22 and replenish the negative electrode 22 with intercalated lithium for consumption during the next battery 20 discharge cycle. The external power source that may be used to charge the lithium ion battery 20 may vary depending on the size, construction, and particular end-use of the lithium ion battery 20. For example only, the external power source may be an AC wall outlet or a motor vehicle alternator.

The size and shape of the lithium ion battery 20 may vary depending on the particular application for which it is designed. In certain instances, the lithium ion battery 20 may also be connected in series or parallel with other similar lithium ion cells or batteries to produce a greater voltage output and power density if it is required by the load device 42. The load device 42 may be powered fully or partially by the electric current passing through the external circuit 40 when the lithium ion battery 20 is discharging. For example only, the load device 42 may be an electric motor for a hybrid vehicle or an all-electrical vehicle, a laptop computer, a tablet computer, a cellular phone, or a cordless power tool or appliance. In certain instances, the load device 42 may be a power-generating apparatus that charges the lithium ion battery 20 for purposes of storing energy.

In certain aspects, the patterned electrodes minimize cracking and damage to an electrode including the electroactive material during cycling. In certain aspects, an electrochemical cell or lithium-ion battery comprising a patterned electrode according to certain variations of the present disclosure has a rate capacity of greater than or equal to about 0.05 Capacity (C/20) up to about 20 Capacity, where the lithium-ion electrochemical cell has good capacity retention (at least 80 capacity retention after 100 cycles).

In certain variations, a lithium-ion battery incorporating a patterned negative electrode according to certain aspects of the present disclosure substantially maintains charge capacity (e.g., performs within a preselected range or other targeted high capacity use) for at least 500 hours of battery operation, optionally greater than or equal to about 1,000 hours of battery operation, optionally greater than or equal to about 1,500 hours of battery operation, and in certain aspects, greater than or equal to about 2,000 hours or longer of battery operation (active cycling). In certain variations, the lithium-ion battery incorporating an inventive patterned negative electrode is capable of operating within 20% of target charge capacity for a duration of greater than or equal to about 2 years (including storage at ambient conditions and active cycling time), optionally greater than or equal to about 3 years, optionally greater than or equal to about 4 years, optionally greater than or equal to about 5 years, optionally greater than or equal to about 6 years, optionally greater than or equal to about 7 years, optionally greater than or equal to about 8 years, optionally greater than or equal to about 9 years, and in certain aspects, optionally greater than or equal to about 10 years. In other variations, the lithium-ion battery incorporating a patterned electrode is capable of operating at less than or equal to about 30% change in a preselected target charge capacity (thus having a minimal charge capacity fade), optionally at less than or equal to about 20%, optionally at less than or equal to about 15%, optionally at less than or equal to about 10%, and in certain variations optionally at less than or equal to about 5% change in charge capacity for a duration of at least about 100 deep discharge cycles, optionally at least about 200 deep discharge cycles, optionally at least about 500 deep discharge cycles, optionally at least about 1,000 deep discharge cycles.

Stated in another way, in certain aspects, a lithium-ion battery or electrochemical cell incorporating the patterned electrode for minimizing damage to the electrode during expansion and contraction during cycling substantially maintains charge capacity and is capable of operation for at least about 1,000 deep discharge cycles, optionally greater than or equal to about 2,000 deep discharge cycles, optionally greater than or equal to about 3,000 deep discharge cycles, optionally greater than or equal to about 4,000 deep discharge cycles, and in certain variations, optionally greater than or equal to about 5,000 deep discharge cycles.

In certain instances, a lithium-ion battery or electrochemical cell incorporating the patterned electrode may be operated (e.g., within the designated voltage potential window ranges) according to methods described in U.S. patent application Ser. No. 14/973,439, filed Dec. 17, 2015, titled "Battery Life by Controlling the Voltage Window of the Negative Electrode," which is herein incorporated by reference in its entirety, to further optimize performance of the lithium-ion battery or electrochemical cell, especially for electroactive materials comprising silicon.

Embodiments of the present technology are further illustrated through the following non-limiting examples.

Example 1

FIGS. 4A-4D illustrate exemplary electroactive materials 120, 130, 140, and 150, which will undergo substantial volumetric expansion and contraction during the cycling of the electrochemical cell, patterned to form a plurality of void spaces 122, 132, 142, and 152 that will accommodate the volumetric expansion and contraction of the electroactive materials 120, 130, 140, and 150 to minimize cracking and damage to an electrode including the electroactive material 120, 130, 140, and 150 during cycling. The illustrated electroactive materials 120, 130, 140, and 150 were disposed on a current collector (not shown) comprising copper using a magnetron sputtering system having an input argon (Ar) flow of about 2 sccm and a silicon (Si) target.

FIG. 4A illustrates an electroactive material 120 comprising silicon and having a thickness of about 4 µm, wherein a plurality of continuous linear void spaces 122 define two sets of parallel lines 126 that intersect or interconnect at right angles and form a repeating grid patterned 124. Parallel non-intersecting lines, for example, 127 and 128, define a width 125 between each of them of about 250 µm.

FIG. 4B illustrates an electroactive material 130 comprising silicon and having a thickness of about 4 µm, wherein a plurality of continuous linear void spaces 132 define two sets of parallel lines 136 that intersect or interconnect at right angles and form a repeating grid patterned 134. A width 135 between parallel non-intersecting lines, for example, 137 and 138, is about 500 µm.

FIG. 4C illustrates an electroactive material 140 comprising silicon and having a thickness of about 4 µm, wherein a plurality of continuous linear void spaces 142 define two sets of parallel lines 146 that intersect or interconnect at right angles and form a repeating grid patterned 144. A width 145 between parallel non-intersecting lines, for example, 147 and 148, is about 750 µm.

FIG. 4D illustrates an electroactive material 150 comprising silicon and having a thickness of about 4 µm, wherein a plurality of continuous linear void spaces 152 define two sets of parallel lines 156 that intersect or interconnect at right angles and form a repeating grid patterned 154. A width 155 between parallel non-intersecting lines, for example 157 and 158, is about 1000 µm.

FIG. 5 shows a graph 170 depicting charge-discharge profiles of Li-ion electrochemical cells including negative electrodes comprising electroactive material 120 illustrated in FIG. 4A and electroactive material 130 illustrated in FIG. 4B, respectively. The graph 170 has an x-axis 178 showing cycle number and a y-axis 180 showing specific capacity in mAh/g. With respect to Li-ion electrochemical cell including negative electrodes comprising patterned electroactive material 120 illustrated in FIG. 4A, 172A illustrates charge and 172B discharge. With respect to Li-ion electrochemical cell including negative electrodes comprising patterned electroactive material 130 illustrated in FIG. 4B, 174A illustrates charge and 174B discharge. The respective charge-discharge profiles 172A and 172B, 174A and 174B are compared to a baseline Li-ion electrochemical cell including negative electrodes comprising unpatterned electroactive material, the baseline Li-ion electrochemical cell is otherwise substantially similar to the Li-ion electrochemical cells including negative electrodes comprising electroactive material 120 illustrated in FIG. 4A and electroactive material 130 illustrated in FIG. 4B. With respect to the baseline Li-ion electrochemical cell, 176A illustrates charge and 176B discharge. For both 172A, 172B and 174A, 174B increased capacity retention is seen when compared with the 176A, 176B of the baseline Li-ion electrochemical cell excluding linear void spaces.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making an electrode for an electrochemical cell, the method comprising:

patterning an electroactive material layer to form a plurality of void spaces therein via a high-speed process selected from the group consisting of: laser ablation, electron beam machining, ion beam milling, roll forming, embossing, lithography, and combinations thereof, wherein the electroactive material layer has a thickness of greater than or equal to about 1 µm and comprises an electroactive material that undergoes volumetric expansion and contraction during cycling of the electrochemical cell, wherein each of the plurality of void spaces has a width greater than or equal to about twice the thickness of the electroactive material layer and a void thickness substantially equal to the thickness of the electroactive material layer and the plurality of void spaces accommodate the volumetric expansion and contraction to minimize cracking and damage to the electrode during the cycling.

2. The method of claim 1, wherein the high-speed process has a speed of greater than or equal to about 0.1 meter/second.

3. The method of claim 1, wherein the patterning comprises directing laser at the electroactive material layer to form a pattern of the plurality of void spaces by laser etching or ablation.

4. The method of claim 3, wherein the laser has a wavelength greater than a reference wavelength corresponding to a bandgap of the electroactive material layer.

5. The method of claim 4, wherein the electroactive material layer is disposed on a current collector and the laser is transparent to the electroactive material layer and absorbed by the current collector causing plasma generation and pressure at an interface between the electroactive material layer and the current collector that results in removal of the electroactive material layer above the interface to create the plurality of void spaces.

6. The method of claim 3, wherein the laser has an optical power output of greater than or equal to about 50 W to less than or equal to about 500 W; a frequency of greater than or equal to about 10 KHz to less than or equal to about 1 MHz; a scan speed of greater than or equal to about 0.5 meter/second to less than or equal to about 10 meters/second; and a working distance of greater than or equal to about 200 mm to less than or equal to about 500 mm.

7. The method of claim 3, wherein the laser has a wavelength shorter than a bandgap of the electroactive material layer and the electroactive material layer directly absorbs the laser and melts and vaporizes to form the plurality of void spaces.

8. The method of claim 1, wherein the electroactive material layer comprises a compound comprising silicon (Si), tin (Sn), germanium (Ge), bismuth (Bi), zinc (Zn), tellurium (Te), lead (Pb), gallium (Ga), aluminum (Al), arsenic (As), lithium (Li), or combinations thereof.

9. The method of claim 1, wherein the electroactive material layer comprises a compound selected from the group consisting of: SiSnAl; SiFeC; SnAl; SnFe; $SnO_2$; SiGe; $LiSi_x$, where 0≤x≤1; $LiSn_x$, 0≤x≤1; and combinations thereof.

10. The method of claim 1, wherein the electroactive material layer is disposed on a current collector comprising a compound selected from the group consisting of: copper (Cu), nickel (Ni), titanium (Ti), carbon (C), iron (Fe), gold (Au), palladium (Pd), platinum (Pt), tantalum (Ta), nickel (Ni), alloys and combinations thereof.

11. The method of claim 1, wherein the electroactive material layer is patterned to form a repeating pattern of closed geometry structures.

12. A method of making a negative electrode for an electrochemical cell that cycles lithium ions, the method comprising:

directing laser towards a negative electroactive material layer to form a pattern of a plurality of void spaces, wherein the negative electroactive material layer has a thickness of greater than or equal to about 1 μm and comprises a negative electroactive material comprising silicon (Si), tin (Sn), germanium (Ge), alloys, and combinations thereof, wherein each of the plurality of void spaces has a width greater than or equal to about twice the thickness of the negative electroactive material layer and a void thickness substantially equal to the thickness of the negative electroactive material layer and the plurality of void spaces accommodate volumetric expansion and contraction occurring in the negative electroactive material layer.

13. The method of claim 12, wherein the laser has a wavelength greater than a reference wavelength corresponding to a bandgap of the negative electroactive material layer.

14. The method of claim 12, wherein the laser has an optical power output of greater than or equal to about 150 W to less than or equal to about 500 W; a frequency of greater than or equal to about 10 KHz to less than or equal to about 1 MHz; a scan speed of greater than or equal to about 0.5 meter/second to less than or equal to about 10 meters/second; and a working distance of greater than or equal to about 200 mm to less than or equal to about 500 mm.

15. The method if claim 12, wherein the laser has a wavelength shorter than a reference wavelength corresponding to a bandgap of the negative electroactive material layer.

16. The method of claim 12, wherein the negative electroactive material layer is disposed on a current collector comprising a compound selected from the group consisting of: copper (Cu), nickel (Ni), titanium (Ti), carbon (C), iron (Fe), gold (Au), palladium (Pd), platinum (Pt), tantalum (Ta), nickel (Ni), alloys, and combinations thereof.

17. The method of claim 12, wherein the negative electroactive material layer is patterned to form a repeating pattern of closed geometry structures.

18. The method of claim 12, wherein the plurality of void spaces occupies a volume of greater than or equal to about 5% by volume of a total volume of the negative electroactive material layer.

* * * * *